July 31, 1945.  N. M. MARSILIUS  2,380,859
MILLING MACHINE
Filed July 21, 1942   4 Sheets-Sheet 1

INVENTOR
Newman M. Marsilius
BY
ATTORNEY

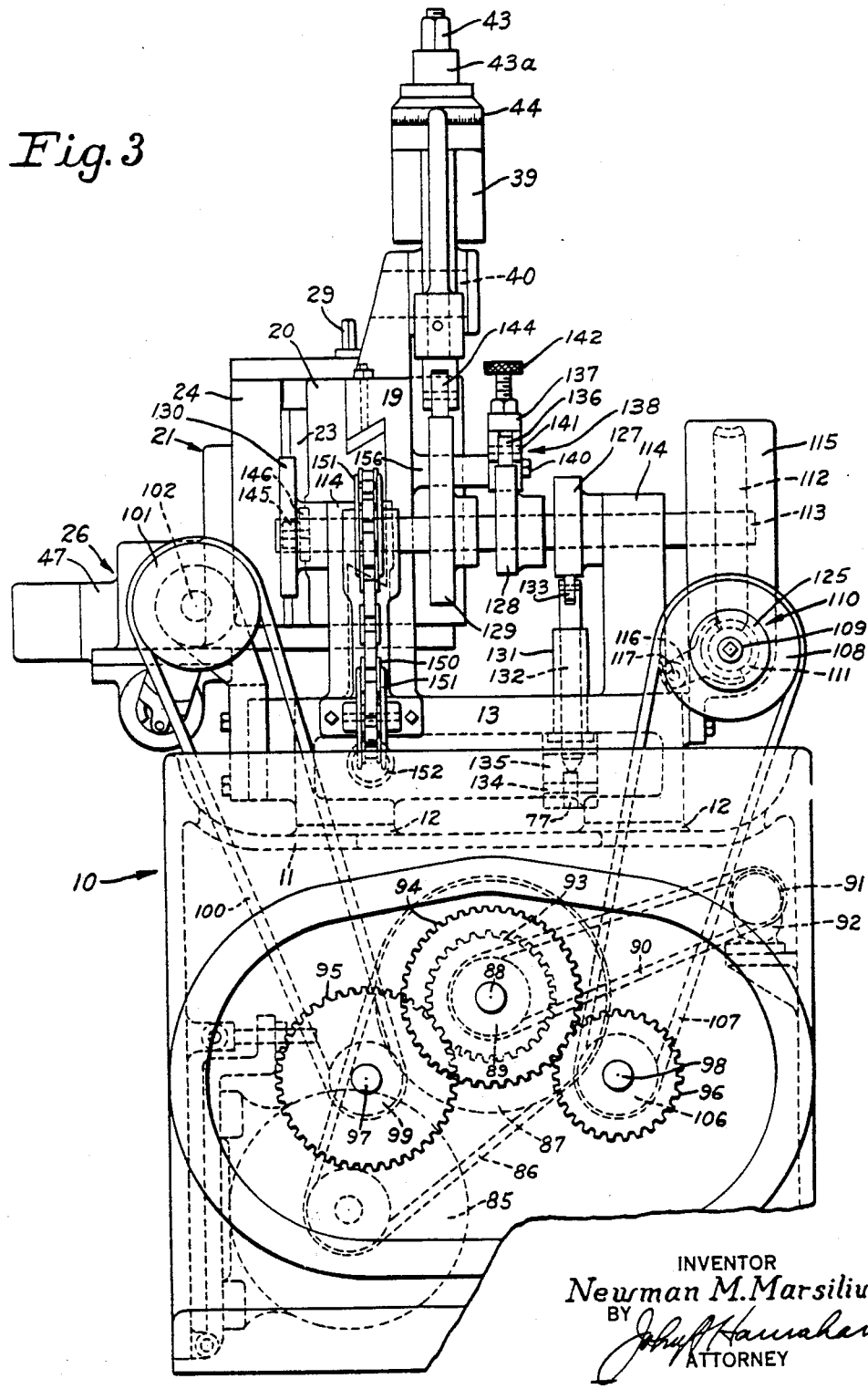

July 31, 1945.   N. M. MARSILIUS   2,380,859
MILLING MACHINE
Filed July 21, 1942   4 Sheets-Sheet 4
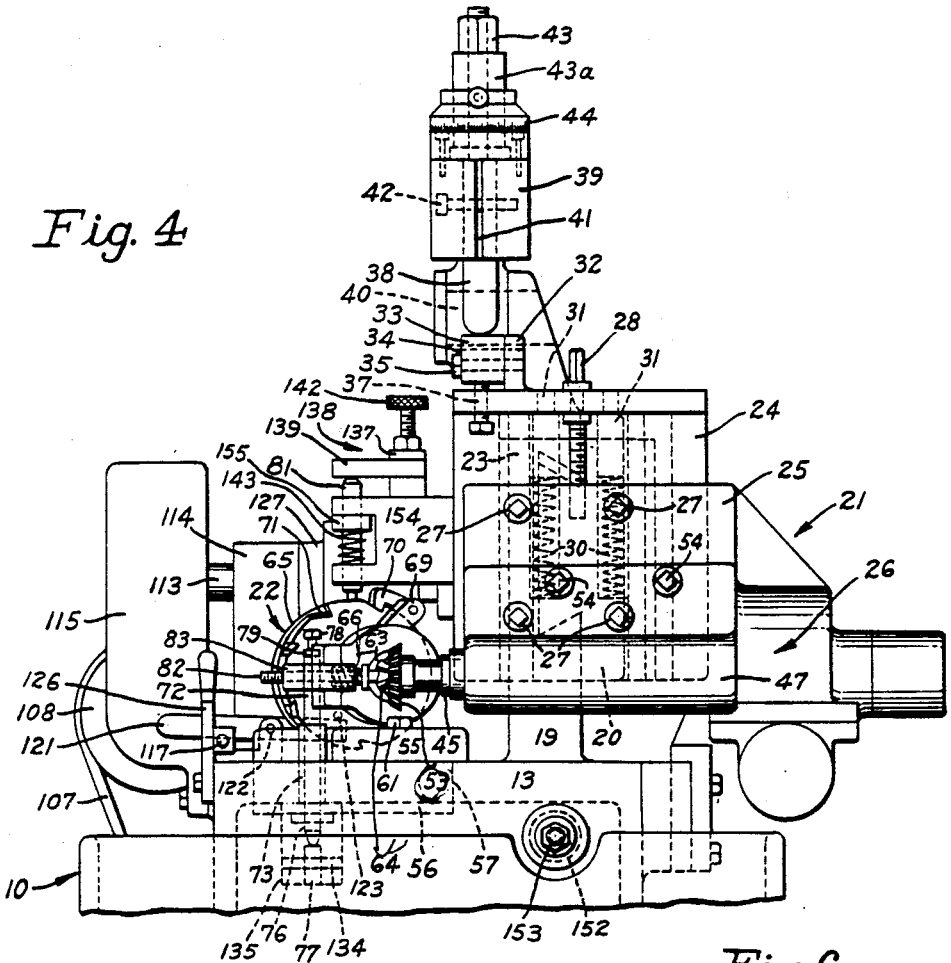
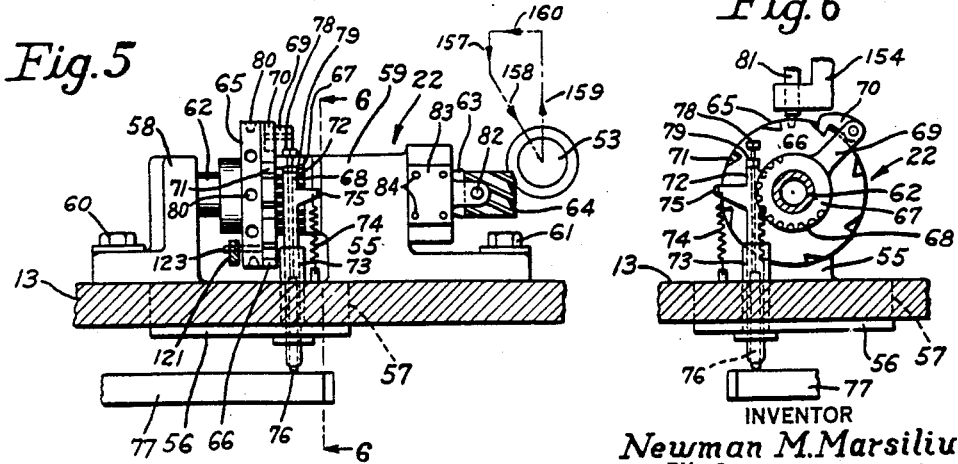
INVENTOR
Newman M. Marsilius
BY
ATTORNEY Patented July 31, 1945

2,380,859

UNITED STATES PATENT OFFICE 2,380,859

MILLING MACHINE

Newman M. Marsilius, Bridgeport, Conn.

Application July 21, 1942, Serial No. 451,693

11 Claims. (Cl. 90—15.1)

This invention relates to new and useful improvements in machine tools and has particular relation to a milling machine especially adapted for milling the bevelled face or end of each spiral flute of spot facing and other types of tools having spiral flutes although the machine may be used for the making of bevelled or inclined cuts on or in other work.

The objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention and the scope of the appended claims.

In the drawings:

Fig. 3 is a rear elevational view showing the means for driving the various active parts of the machine;

Fig. 4 is a front elevational view, on a larger scale than Figs. 1 and 2, of the upper portion of the machine, the base being broken away;

Fig. 5 is a detail sectional view, on the scale of Fig. 4, the view being taken as along the plane of the line 5—5 of Fig. 1; and Fig. 6 is a detail sectional view taken as along the plane of the line 6—6 of Fig. 5.

Figure 1:
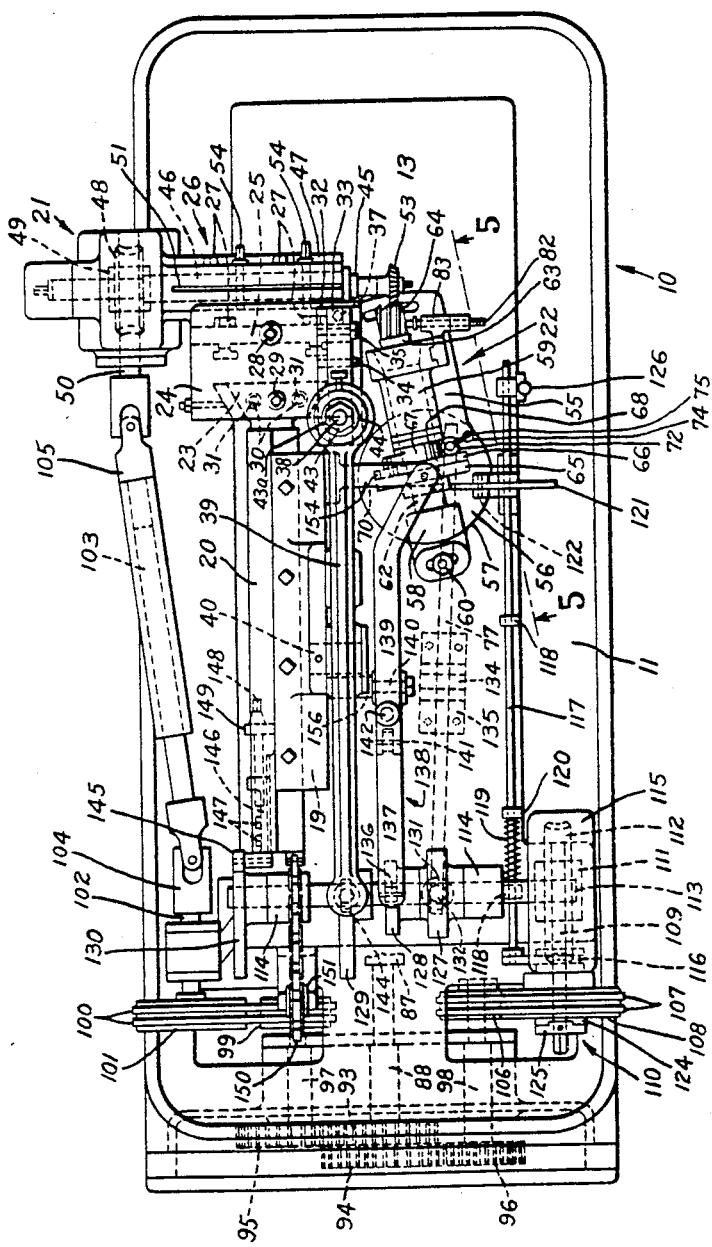
Fig. 1 is a top plan view of the machine of the invention.

The present machine is especially designed for the milling of the face or end of each flute of a spot facing or other fluted tool the spiral flutes of which have been cut as disclosed in my copending application Serial Number 451,692, filed July 21, 1942, although the machine may be used for other work. To the desired end the present machine includes adjustable means for supporting the work in the proper relation to a cutter whereby the free end of each flute in the work will be cut in the proper relation to the flute regardless of the pitch of the latter.

Referring in detail to the drawings the machine of the invention as shown includes a base 10, which is hollow and generally rectangular including an upper or top wall 11 carrying pads 12 mounting a bed 13. Base wall 11 inclines toward the forward end of the machine to drain through a chamber 14 into a sump 15. A screen 16 in the bottom wall of chamber 14 serves to remove from coolant being returned to sump 15 chips and the like and these chips may be removed from the chamber through an opening 17 while the sump is provided with a clean-out door 18.

Fixed on or integral with the bed 13 is a support 19 in which is mounted, for horizontal movements, a slide 20 at its forward end carrying a tool head generally designated 21. On the bed to one side of the support 19 and head 21 is a work holder generally designated 22 and later to be fully described. Support 19 has a dovetailed groove opening through one side and each end thereof and slide 20 is mounted in and movable through said groove. At its forward end slide 20 carries a head 23 dove-tailed in plan and mounting, for vertical movements, a tool head 21. The latter includes a block 24 mounted on head 23 and in turn having mounted thereon, for vertical adjustment, a plate 25 carrying a cutter holder and driving means 26.

T-bolts 27 secure plate 25 in position to the block 24 and a vertical adjusting screw 28 passing through a ledge-like portion of said block is secured to the said plate and is adapted for manipulation to raise and lower the plate and the cutter holder 26 when the bolts 27 are loosened. A somewhat similar screw 29 is adapted for manipulation to adjust the position of the block 24 vertically relative to the head 23. Coil springs 30 located in recesses or sockets in the head 23 pressing against plungers 31 carried by the block 24 constantly tend to raise said block and the cutter holder and driving means 26.

A flange 32 on the upper side of block 24 has a plate 33 mounted thereon by a pivot 34 and a pair of bolts 35 located at the opposite sides of said pivot and passing through enlarged holes or slots 36 in the plate are adapted to clamp the latter to the flange 32 in the desired position of adjustment about pivot 34. On loosening of bolts 35 other and vertically disposed bolts 37 are manipulated to move plate 33 to the desired angle and thereafter bolts 35 are tightened.

Bearing on the upper side of plate 33 is a stud 38 carried by the forward end portion of a cutter lever 39 pivoted at 40 to the support 19. The forward end of the lever 39 is split as at 41 and a bolt 42 passing through such end is adapted to be tightened to clamp the stud 38 in place. On loosening of said bolt and nuts 43 on the upper end of said stud a nut 43a may be turned on the stud in relation to a dial 44 to make micrometer adjustments of the stud with relation to the forward end portion of the lever 39.

Cam means (as will be described) serve to rock lever 39 in timed relation with motion of other parts of the machine and it will be clear that the springs 36 serve to maintain plate 33 against the lower end of the stud 38 and that the lever 39 through said stud may operate to depress the block 24 on the head 23.

The cutter holder 26 includes a chuck 45 carried by the forward end of a spindle or shaft 46 mounted in the holder 26 and within a casing 47 forming part of said holder, having fixed thereto a worm gear 48 meshing with and driven by a worm 49 on a short shaft 50. Shaft 50 is driven in a manner to be described. Holder 26 above shaft 46 has a split portion 51 provided with a socket 52 adapted to receive a support (not shown) for the outer end of the spindle of a milling cutter 53 the inner end portion of whose spindle is in the chuck 45. On tightening of bolts 54 such split portion 51 is drawn tight onto the mentioned support to secure the same in position.

Work holder 22 comprises a base 55 including a circular projection 56 on its under side and turnably received in a circular recess or opening 57 in the bed 13. Aside from the projection 56 the remaining portions of the base rest on the upper side of the bed 13 and support a pair of spaced bearings 58 and 59 beyond the outer sides of which portions of the base extend and through arcuate slots in which portions bolts 60 and 61 pass. A tubular shaft 62 is mounted by the bearings 58 and 59 and at its forward end mounts a chuck 63 for receiving the shank of a tool or piece of work 64. the end faces of the flutes of which are to be bevelled. Work 64 is the same piece the flutes of which have been cut as in the machine of my companion application above mentioned.

Fixed on the shaft 62 between the bearings 58 and 59 are a locking disc 65, and an indexing disc 66 while a member 67 at the forward side of the indexing disc 66 is also on the shaft but is turnable about the same. The hub-like portion of member 67 is provided with gear teeth 68 and said member includes an arm 69 to the outer end portion of which is pivoted a pawl 70 for cooperation with the notches 71 of the indexing disc. Meshing with the teeth 68 of the member 67 are the teeth of a rack bar 72 mounted for vertical movement in a guide device 73 carried by the base 55 and extending through the projection 56. A coil spring 74 is connected at its upper end to a projection 75 on the rack bar and at its lower end is anchored to the base 55. This spring serves as will be set forth.

The bar 72 is hollow and passing therethrough is a bar or pin 76 the lower end of which is disposed on an end portion of a rocker bar 77 and the upper end of which projects above the rack bar and is provided with a head-like portion 78 by means of which it may be turned to adjust it vertically through the rack bar. To this end the pin is threaded to the rack bar and following an adjustment is locked in position by a jam nut 79. By adjusting the lower end of the pin 76 through the lower end of the rack bar the movement which will be imparted to the latter by the rocker bar 77 is controlled. Disc 65 is provided with openings or recesses 80 in its periphery and a locking finger or pin 81 is adapted to enter one of these notches to lock the disc 65 and thereby the shaft 62 in fixed position during a cutting operation on work held by the chuck 63. A stop or locating finger 82 is mounted by a bracket 83 fixed to the outer side of the bearing 59 as by screws or the like 84 as best shown in Fig. 5.

Figure 2:
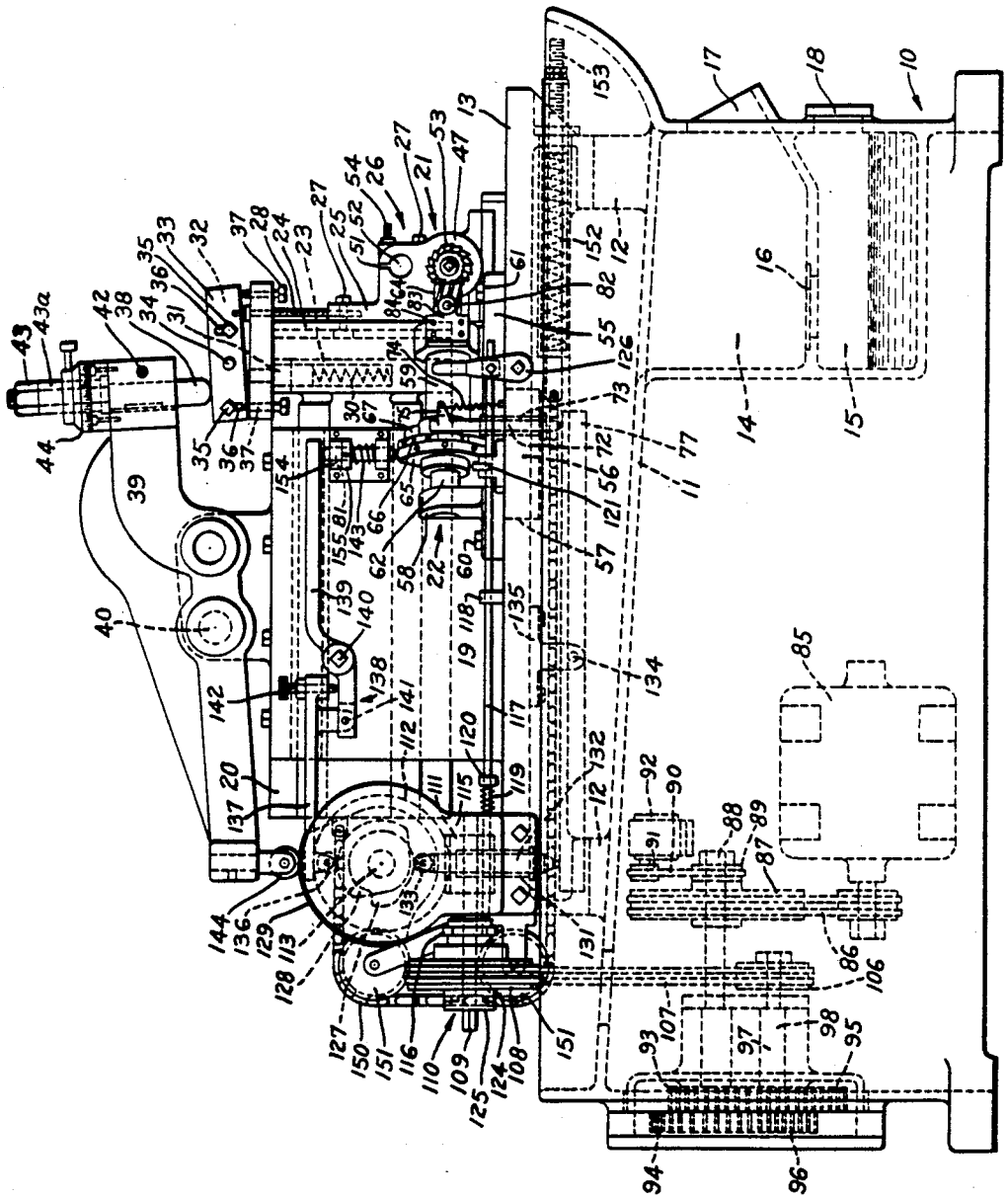
Fig. 2 is a side elevational view of said machine.

A motor 85 mounted in the base 10 provides the power for operation of the various means described. This motor (see Figs. 2 and 3) through a belt 86 drives a pulley 87 on a shaft 88. From a pulley 89 on said shaft a belt 90 drives a pulley 91 on the shaft of a pump 92 whereby the latter is operated to supply coolant to the cutter 53 as will be understood, the piping for the coolant not being shown. On shaft 88 are gears 93 and 94 driving, respectively, gears 95 and 96 on shafts 97 and 98 respectively.

Fixed on shaft 97 is a pulley 99 which through a belt 100 drives a pulley 101 on a short shaft 102 coupled with a flexible, extensible driving shaft 103 through a universal joint 104. At its forward end shaft 103 is coupled through a universal joint 105 with the short shaft 50 mounting the worm 49. On shaft 98 is fixed a pulley 106 which through a belt 107 drives a pulley 108 mounted on a shaft 109 and coupled in driving relation therewith through a clutch means 110. Fixed on shaft 109 is a worm 111 meshing with a worm gear 112 fixed on a cam shaft 113 extending transversely of the bed 13 at the rear end thereof and rotatably mounted in bearings 114 supported from said bed. A suitable casing 115 encloses the worm and worm gear.

Clutch 110 is controlled by a yoke 116 to which is connected an operating rod 117 extending forwardly over the bed 13 to a point somewhat beyond midway of the latter. Rod 117 passes through guides 118 on the bed and a coil spring 119 about a portion of the rod bears at its respective ends against one of said guides and a collar 120 on the rod. The tendency of spring 119 is to shift the rod in a direction to move yoke 116 to a position opening or disconnecting the clutch. Near its forward end rod 117 is provided in its upper portion or side with a notch and when the clutch 110 is coupled to have the pulley 108 drive the worm 111, a latch 121, pivoted at 122, is entering said notch and holding the rod against the tendency of the spring.

The machine of the invention operates through a definite cycle and at the end of such cycle a trip pin 123 (see Fig. 5) on the locking disc 65 strikes the upper side of the inner end portion of latch 121 and rocks the latter on its pivot 122 lifting its outer portion from the notch in the rod 117. Thereupon the spring 119 functions to shift the rod and disconnect the clutch 110 bringing the machine to a stop. Thus it will be seen that the drive to the cam shaft 113 is stopped at the end of each complete cycle of the machine's operation. Uncoupling of the clutch involves the movement of pulley 108 to shift the pulley carried clutch element 124 from the shaft carried clutch element 125. A lever 126 is provided for manual movement of the rod 117 when coupling the clutch 110.

Mounted on the shaft 113 are an indexing cam 127, an index locking cam 128, a cutter lever operating cam 129 and a slide operating cam 130. Passing vertically through a guide 131 in the bed 13 is a bar 132 located below the indexing cam 127. At its upper end this bar carries a roller 133 bearing against cam 127 and at its lower end said bar rests on the rear end portion of the rocker bar 77. It is noted that the latter is located below the bed 13 and intermediate its ends is pivoted at 134 to a pad 135 secured to the underside of the bed. As above set forth the forward end portion of the bar 77 is engaged by the lower end of the pin 76 of the rack bar 72.

Riding on the cam 128 is a roller 136 carried by an arm or portion 137 of a lever generally designated 138 and in addition to the rear portion 137 including a forward portion 139. Lever portion 139 is pivoted to the support 19 as at 140 and the forward end of such lever portion 137 is pivoted to the rear portion of the lever at 141. Portion 137 carries a screw 142 adjustable against portion 139 to lock such portions together so that as the high portion of cam 128 moves under the roller 136 the entire lever 138 will be rocked on its pivot 140. Under such circumstances the forward end of the lever being against the top end of pin 81 the latter will be depressed to force its lower end into one of the recesses 80 in the locking disc 65. On the high portion of cam 128 receding a spring 143 about the pin 81 elevates the latter and rocks the lever 138 on pivot 140 maintaining the roller 136 against the cam 128 and raising the pin 81 out of locking relation with the disc 65.

Riding on cam 129 is a roller 144 carried by the rear end portion of the cutter lever 39. Since such lever is pivoted intermediate its ends at 40 it will be clear that as the high portion of cam 139 moves under roller 144 the rear end portion of lever 39 will be raised and its forward end portion lowered so that the stud 38 will force the block 24 and the cutter head 26 downwardly on the head 23 to shift the cutter 53 toward the work 64. This will be against the tendency of the springs 30 and therefore as the high portion of cam 129 recedes from roller 144 the said springs will serve to return the block 24 and parts carried thereby to their normal positions and rock the cutter lever 39 in the opposite direction maintaining the roller 144 against the cam.

A roller 145 rides against the cam 130 and such roller is carried by a block 146 bolted to the slide 20 as at 147. A micrometer adjusting screw 148 passes through a lug 149 on the slide and is threaded into the block 146 whereby on loosening of the screws 147 the said micrometer adjusting screw may be manipulated to adjust the roller 145 relative to the cam 130. Thereafter the bolts 147 are tightened to secure the block 146 rigid with the slide. With this arrangement it will be understood that as the high portion of the cam 130 engages the roller 145 the slide 20 and all parts carried thereby will be moved forwardly relative to the support 19.

A flexible connector as the chain 150 is secured to the rear end portion of slide 20 and passes over pulleys 151 at the rear of the machine and then under bed 13 where it is connected to one end of a coil spring 152 anchored to a screw 153. With this construction as the high portion of cam 130 recedes from roller 145 the coil spring 152 through the chain 150 serves to retract the slide 20 and parts carried thereby and to maintain said roller in contact with the cam.

Extending laterally from the support 19 is a bracket 154 bifurcated at its free end. Pin 81 is mounted in the bifurcated portion of the bracket and the return spring 143 about such pin bears at its lower end against the lower arm of the bifurcated bracket portion and at its upper end against a collar 155 fixed to the pin but located inwardly of the upper arm of the bifurcated bracket portion. Lever 138 is pivotally mounted on the outer end of a bracket 156 also extending laterally from the support 19.

In the following description of the operation of the machine it will be assumed that a finished piece of work has been removed from the chuck 63 and a new piece secured therein. Under such circumstances the motor 85 will be operating and the cutter 53 rotating although other parts of the machine will be stationary. Before tightening the chuck on the shank of the new piece of work the operator turns the work to bring a wall of a flute against stop finger 82 and maintaining the work in such relation tightens the chuck.

If the work 64 is a new piece on which the machine has not been operating the bolts 60 and 61 are loosened and the work holder 22 given any slight necessary turning movement with the projection 56 as a pivot. This is permitted since the mentioned bolts pass through arcuate slots in the base of the work holder as best shown in Fig. 1. When the work holder has been turned to a position such that a wall of a flute of the work is positioned at ninety degrees to the axis of the cutter 53 the bolts 60 and 61 are tightened to to secure the work holder in that position. As shown cutter 53 has flat front and rear sides and is of the width of a flute the end face of which is to be bevelled. Therefore the work holder may be adjusted with the projection 56 as a pivot to bring a flute wall into parallel relation with the front or rear face of the cutter 53.

Now lever 126 is used to couple the clutch 110 and the cam shaft 113 is rotated. At this time cam 128 is maintaining lever 138 with its forward end portion pressing the pin 81 downwardly so that its lower end is in a recess in the disc 65 thus locking the chuck 63 and work 64 against movement. The motion imparted to the cutter 53 by the action of the cams 129 and 130 is illustrated by the arrows in Fig. 5.

Thus cam 129 initially functions and rocking the lever 39 brings about a downward movement of the head 21 so that the cutter 53 moves downwardly in a straight line as indicated by the arrow 157 (in Fig. 5). At the end of such initial straight vertical movement of head 21 the cutter has engaged the work 64 and the cam 130 comes into play. As it moves the slide forwardly such movement is combined with the continued downward movement imparted by cam 129 with the result that the cutter moves at an incline as suggested by the arow 158. This inclined movement is the actual cutting movement and the angle of the incline is determined by the relative contours of the cams 129 and 130.

At the end of such inclined movement the cut is complete and the high point of cam 129 recedes from roller 144 whereupon the springs 30 function to raise the head 21 but at this time the slide and the head are held forwardly by the cam 130. The last mentioned vertical movement is indicated by the arrow 159 in Fig. 5. When the vertical return movement of the head 21 and cutter 53 has been completed the high point of cam 130 recedes from roller 145 and the coil spring 153 through the chain 150 retracts the slide and the head 21 moving the cutter back to starting position as indicated by the arrow 160 in Fig. 5.

While the head and cutter are being given the movements indicated by the arrows 159 and 160, that is, the return movements, the work is being indexed. In this operation as the high point of cam 128 recedes from roller 136 the spring 143 raises pin 81 from locking relation with the disc 65 and then the cam 127 depresses plunger 132 and rocks lever 77 so that its forward end portion raises the rack bar 72 and the teeth of the latter meshing with those of the member 67 the latter is given a turning movement and the pawl 70 is moved to index the disc 66 and thus shaft 62 and the chuck and work. At the end of the indexing movement the cam 128 raises the roller 136 rocking lever 138 to again depress the pin 81 into locking relation with the disc 65.

The above described movements of the cutter are then repeated and the face of another flute of the work bevelled. At the end of a complete revolution of the disc 65 (and thus of the shaft 62 and the work 64) the trip pin 123 on the disc 65 engages and rocks the lever 121 releasing the rod 117 and permitting the spring 119 to move such rod to disconnect the clutch elements. This brings all parts of the machine, with the exception of the cutter and its drive, to a stop whereupon the completed piece of work may be removed from the chuck 63 and a new piece of work placed therein.

By using the proper size of cutter 153 and controlling the cutting movement thereof as indicated by the arrows 158 the machine may be adapted for the bevelling of the end faces of the flutes of various sizes of tools 64. The indicated movement of the cutter is controlled by the result of the movements imparted by the cams 129 and 130 and the position of the plate 33 in its relation to the stud 38 enters into such movement of the cutter. Said plate 33 and its associated parts provide an adjustment to compensate for the rate of feed of head 21 due to variations of feed caused by the arcuate movement of stud 38 in its downward stroke.

On proper adjustment of the plate 33 about pivot 34 the machine may be adapted for the making of bevelled cuts without cam 129 entering into the inclined cutter movement. In such instance the plate will be inclined opposite to the position in which it is shown and the cam 129 will rock the lever 39 to have the cutter 53 moved vertically as indicated by arrow 157. Then as the slide is moved forwardly by the cam 130 the plate riding under the stud 38 will be forced downwardly carrying the cutter with it. The cutter being moved downwardly as it is moved forwardly the resultant movement is at an incline as indicated by arrow 158.

Clearly in such a case the angle at which the cutter is moved will depend on the angle of adjustment of the plate 33. This plate may be used also to impart vertical movements to the cutter for work other than that already described. For example, the plate when adjusted to incline in the direction shown is adapted for the movement of the cutter in the manner necessary for the cutting of a flute of constant depth in a tapered piece supported to have its smaller diameter end first engaged by the cutter. In addition to what has been said the plate need not have a smooth or straight edge engaged by the stud 38 but may be formed as desired for the imparting of any desired vertical movement or movements to the cutter. As the plate is bolted in place it will be clear that any plate may be removed and replaced by another plate of any desired shape for the imparting of the desired movement or movements to a cutter when the latter is moved horizontally.

When cuts of even depth are to be made, as grooves or slots, in a piece having a contour the desired movement is imparted to the cutter by the combined action of cam 129 and the plate 33 and cam 130. Any contour cut is made due to the combined action of the parts named and such cuts need not be of even or constant depth. In making a contour cut, as a slot or groove in a sphere, half of the contour cut is determined by the cam 129 and the other half by the plate 33. That is, the variable motions, both vertically and horizontally, required for the making of a cut in a ball or sphere or other contour part requires the use of both the cams 129 and 130 as well as the use of the proper plate 33 properly adjusted and then influenced by the cam 130.

When cutting shapes which are angular the cutter is controlled only by the cams 129 and 130 if the angles are substantial. Where a slight incline is being cut—as below 10°—the inclined movement of the cutter may be controlled entirely by the template 33. In cutting on a contour or curve the combined action of the cams 129 and 130 causes the cutter to follow the curve as closely as possible with a series of straight lines crossing the curve. Then the template 33 has its engaged edge the exact curve to be cut and through movements of the cutter against and by the springs 30 the cutter is moved in the exact curved path desired.

Having thus set forth the nature of my invention, what I claim is:

1. In a machine for milling the end faces of the spiral flutes of a tool, a work holder including a horizontally disposed chuck for supporting a tool from its shank end, a support, a slide horizontally movable on said support, a head vertically movable on said slide, a cutter holder carried by said head, means for simultaneously lowering said head and moving said slide while the cutter holder is engaging a cutter with the free end portions of the tool to cut the latter on an angle, means for indexing the chuck at the end of each such cut, and means mounting said work holder for pivotal adjustment about a vertical axis whereby to support a tool with the wall of a flute the end face of which is being cut disposed at an angle of ninety degrees to the axis of the cutter.

2. In a machine for the purpose specified, a cutter holder, means mounting said cutter holder for up and down movements and for back and forth movements, means for rotating said holder, a work holder including a chuck, means mounting said chuck for indexing movements about a horizontal axis, and means mounting said entire work holder for pivotal adjustment about a vertical axis to dispose work at the desired angle to the axis of a cutter in said holder.

3. In a machine for milling the end faces of the spiral flutes of a tool, a bed, a work holder on said bed, a support on said bed, a slide mounted on said support for back and forth horizontal movements, a head mounted on said slide for up and down movements, a cutter holder on said head, means for rotating said cutter holder, a cam shaft on said bed, means for driving said shaft, a cam on said shaft for imparting forward movements to the slide, a cam on said shaft for imparting downward movement to said head simultaneously with forward movement of the slide when the cutter holder has engaged a cutter with the end portion of a flute of a tool whereby to cut a bevelled face on the same, means then operative to raise said head and retract said slide, said work holder including a chuck, third and fourth cams on said shaft, means operated by said third cam and locking said chuck against movement during a cutting operation, means operated by the fourth cam to index said chuck about a horizontal axis while said head is being raised and said slide retracted, and means mounting said work holder on said bed for pivotal adjustment about a vertical axis to have said chuck present the work with a wall of a flute the face of which is being bevelled located at the desired angle to the axis of the cutter.

4. The machine as in claim 1 including means for stopping said machine at the end of each complete revolution of said work holding chuck.

5. The machine as in claim 3 including means to stop the drive of said cam shaft at the end of each complete revolution of said work receiving chuck.

6. In a milling machine, a work holder, a slide, means mounting said slide for horizontal movement, a cutter holder on said slide and movable vertically thereon, means for moving said slide horizontally to carry the cutter holder toward and from the work holder, a plate on said cutter holder, a cutter lever bearing at its forward end on the upper side of said plate, a cam engaging the other end of said cutter lever, means pivoting said lever intermediate its ends, spring means constantly urging said cutter holder upwardly on said slide and maintaining said plate against said forward end of the cutter lever, and means for adjusting said plate to an angular relation to the horizontal whereby as the slide is moved horizontally the cutter holder is moved vertically as the inclined plate is moved under the forward end of said cutter lever.

7. In a milling machine, a work holder, a slide, means mounting said slide for horizontal movements, a head on said slide and movable vertically thereon, a cutter holder on said head, means for moving slide horizontally to carry the cutter holder toward and from the work holder, a plate on said head, rigid means at the upper side of said plate, spring means normally maintaining said head in position with said plate bearing against said rigid means, and means for adjusting said plate to a position at an angle to the horizontal whereby as the slide is moved horizontally toward and from the work holder the head is moved vertically as the inclined plate is moved horizontally under said rigid means.

8. In a milling machine, a work holder, a slide, means mounting said slide for horizontal movement, a cutter holder on said slide and movable vertically thereon, means for moving said slide horizontally to carry the cutter holder toward and from the work holder, a plate movable with said cutter holder, bearing means at the upper side of said plate and mounted independent of said slide, spring means normally urging said plate into engagement with said bearing means, means pivotally mounting said plate, threaded means engaging said plate and adapted to adjust the same about said pivot to position the plate at an angle to the horizontal, and means for securing the plate in adjusted position whereby as the slide is moved horizontally and the plate is carried horizontally under said bearing means a vertical movement is imparted to said tool holder.

9. In a milling machine, a bed, a work holder on the bed, a support on the bed, a slide on the support for back and forth horizontal movements, a head mounted on the slide for vertical movements relative thereto, a cutter holder on the head, means for rotating the cutter holder, said bed having an opening therethrough, said work holder including a base having a projection at its under side entering said opening and mounting the work holder for pivotal movement on the bed about a vertical axis, said base including a portion beyond said projection for locking the base in adjusted positions on the bed, bearing means on the upper side of the base, horizontally rotatable means including a work receiving chuck mounted by said bearing means, an index disc fast to said rotatable means, means turnable on said rotatable means, a pawl on the last named means for cooperation with said indexing disc to actuate the latter and index said rotatable means including the work receiving chuck, a cam shaft on said bed, means for driving said shaft, a cam on said shaft for imparting forward movements to said slide, a cam on said shaft for imparting downward movement to said head simultaneously with forward movement of the slide when the cutter holder has engaged a cutter with the end portion of a flute of a tool held by said chuck whereby to cut a bevelled face on the same, means then operative to raise said head and retract said slide, third and fourth cams on said shaft, means operated by said third cam and locking said chuck against movement during a cutting operation, means operated by the fourth cam and connected to operate the means turnable on the rotatable means to actuate the pawl and index the chuck while said head is being raised and the slide retracted, and said pivotal mounting of the base on the bed providing for disposition of the chuck to present the work with a wall of a flute the face of which is to be bevelled at the desired angle to the axis of a cutter held by said cutter holder.

10. In a milling machine, a bed, a work holder on the bed, a support on the bed, a slide on the support for back and forth horizontal movements, a head mounted on the slide for vertical movements relative thereto, a cutter holder on the head, means for rotating the cutter holder, said bed having a circular recess therein, said work holder including a base on the upper side of said bed, a circular projection on the under side of said base and disposed in said recess for guiding pivotal adjustment of the base on the bed, said base having an arcuate slot therein beyond said projection, means on the bed and entering said slot for securing the base in adjusted position on the bed, bearing means on the outer side of said base, horizontally rotatable means including a work receiving chuck mounted on said bearing means, an indexing disc fast to said rotatable means, means turnable on said rotatable means, a pawl on the last named means for cooperation with said indexing disc to actuate the latter and index said rotatable means including the work receiving chuck, a cam shaft on said bed, means for driving said shaft, a cam on said shaft for imparting forward movement to said slide, a cam on said shaft for imparting downward movement to said head simultaneously with forward movement of the slide when the cutter holder has engaged a cutter with the end portion of a flute of a tool held by said chuck whereby to cut a bevelled face on the tool, means then operative to raise the head and retract said slide, third and fourth cams on said shaft, means operated by said third cam and locking said chuck against movement during a cutting operation, and means operated by the fourth cam and connected to operate the means turnable on the rotatable means to actuate the pawl and index the chuck while said head is being raised and the slide retracted.

11. In a milling machine, a bed, a work holder on the bed, a support on the bed, a slide on the support for back and forth horizontal movements, a head mounted on the slide for vertical movements relative thereto, a cutter holder on the head, means for rotating the cutter holder, said bed having a circular recess therethrough, said work holder comprising a base having a circular projection on the under side thereof for mounting the base for pivotal adjustment with said projection in said recess, said base including a portion beyond said projection for locking the base to the bed in adjusted position of the base on the bed, bearing means on the upper side of said base, horizontally rotatable means including a work receiving chuck mounted by said bearing means, an index disc fast to said rotatable means, means turnable on the rotatable means, a pawl on the last named means for cooperation with said indexing disc to actuate the latter and index said rotatable means including the work receiving chuck, gear teeth on said means, a rack passing through said circular projection and the base and having its teeth meshing with said gear teeth, a coil spring connected with said rack and anchored to said base and normally tending to maintain the rack in predetermined relation with the base, a cam shaft on said bed, means for driving said shaft, a cam on said shaft for imparting forward movements to said slide, a cam on the shaft for imparting downward movements to said head simultaneously with forward movements of the slide when the cutter holder has engaged a cutter with the end portion of a flute of a tool held by said chuck whereby to cut a bevelled face on the tool, means then operative to raise said head and retract said slide, a third and a fourth cam on said shaft, means operated by said third cam and locking said chuck against movement during a cutting operation, and means operated by the fourth cam to shift said rack against the tendency of said spring and thereby impart movement to said means turnable on the rotatable means to actuate the pawl and index the chuck while said head is being raised and the slide retracted.

NEWMAN M. MARSILIUS.